Feb. 19, 1963 M. A. RICE 3,078,167
METHOD OF PREPARING INSTANT DRY MILK
CONTAINING FAT AND PRODUCT
Filed April 24, 1961
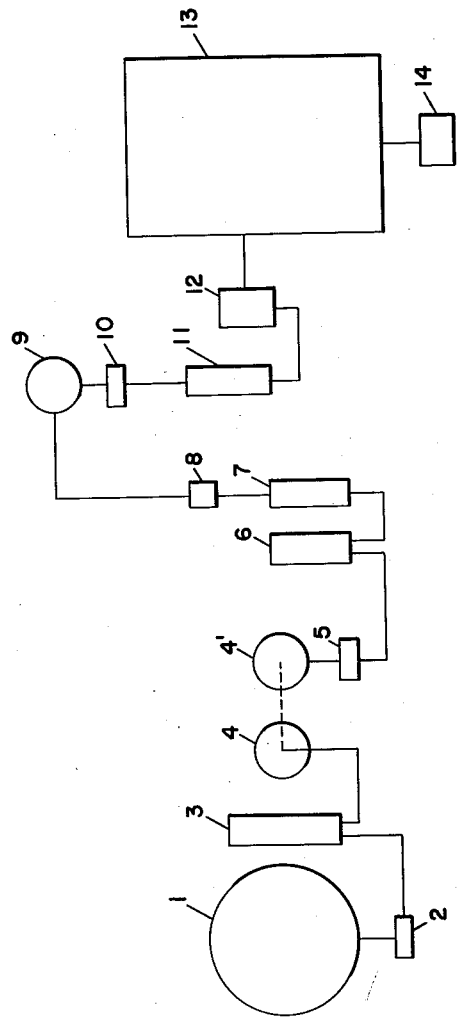
INVENTOR.
MAURICE A. RICE
BY Joseph G. Werner
ATTORNEY United States Patent Office 3,078,167
Patented Feb. 19, 1963

3,078,167
METHOD OF PREPARING INSTANT DRY MILK
CONTAINING FAT AND PRODUCT
Maurice A. Rice, St. Paul, Minn., assignor to North Star
Dairy, St. Paul, Minn., a co-operative association of
Minnesota
Filed Apr. 24, 1961, Ser. No. 104,920
19 Claims. (Cl. 99—56)

This invention relates to methods for preparing instant dry milk containing fat, and to the product produced thereby.

"Dry milk containing fat" as used herein is intended to mean dry milk containing not less than 10% fat by weight. The present application is a continuation-in-part of my co-pending application Serial Number 607,493, filed August 31, 1956, now Patent No. 2,994,612.

Earlier attempts to produce instant dry milk containing fat have not been satisfactory because of difficulties in wettability of the dry product and in the reconstitution of the product when mixed with water or milk. Such earlier attempts have also disclosed problems in obtaining satisfactory flavor of and shelf-life for the product.

I have discovered improvements in the methods for producing instant dry milk containing fat and in the resultant products. I have also found improvements in the methods for production and in the instant dry milk containing fat over that described in my Patent No. 2,994,612. For example, I have discovered that a concentration of solids lower than that described in my co-pending application produces a very satisfactory instant dry milk containing fat. Moreover, by adding fat to the mixture after the holding and seeding treatment, the fat is not subjected to the handling of the earlier steps. Furthermore, the solubility of the product is increased and the flavor enhanced thereby. Where the mixture of the concentrate and fat is homogenized before drying, "oiling off" of the fat is minimized.

An object of this invention is to provide a novel process for the manufacture of an instant dry milk product containing fat, which, when mixed with water, fluid milk or the like, will readily be reconstituted into a fluid milk product containing fat.

Another object of the invention is to provide a method for the manufacture of an instant dry milk product containing fat, which, when reconstituted into a fluid milk product, has a flavor and consistency similar to that of fresh milk containing fat.

An additional object of the invention is to provide a method for producing dry milk solids containing fat having the same relative proportions of milk solids, as existed in the fresh milk from which the milk solids are made.

A further object is to produce a dry milk product containing fat which will be readily dissolved upon the addition of water.

Additional objects and advantages of the invention will appear from the following description in which a preferred and practical embodiment has been set forth in conjunction with the accompanying drawing.

In the drawing: FIG. 1 is a flow diagram illustrating one procedure for practicing the invention.

In reconstituting a dry milk product with water, three factors are involved. These are:

(1) Wettability
(2) Dispersibility
(3) Solubility

First, the particle of dried product must be wetted with the water. The particle must then be transported to the liquid phase, and finally dissolved and lose its identity as a particle. These steps are all very important.

In order to increase the rate of wetting, the particle must be of such size that the water may enter the mass of milk powder by capillary action. As the various particles become wetted they are drawn into the liquid phase. The larger the mass of the particle the more readily will it wet, but it will have a tendency to move to the bottom of the vessel and require a longer time to dissolve.

Accordingly, it is essential to have controlled particle size. It is desirable to have a particle of such size that it will wet with water but yet must be small enough in size so that it will remain suspended in the water without settling to the bottom.

To obtain large particles of dry milk, it is necessary to form relatively large droplets during the atomization of the milk concentrate in the drying chamber. This is accomplished by reducing the spraying pressure, by increasing the orifice size of the spray nozzle and by increasing the viscosity of the concentrate. Viscosity of the concentrate may be increased by increasing the relative amount of the total solids, or by crystallizing the lactose. The increase of total solids is not a practical method for increasing viscosity because with the increased solids there is a definite danger of rendering insoluble the proteins of milk, particularly the caseins. This is indicated by high solubility index readings that are sometimes encountered. The concentrate should be kept between 35% and 45% total solids, which is below the concentration of total solids taught by the prior art for this product, and the lower range being below the solids concentrated of my co-pending application. When the concentration is above 45% total solids, difficulties with insolubility are encountered.

Procedures have previously been developed for the "seeding" of concentrated milk solids with lactose crystals to produce and expedite crystallization of the lactose contained in the concentrated milk solids. Prior procedures have further incorporated the use of spray drying practices for the production of powdered products. Such procedures have provided for a supersaturated concentration of the milk lactose with relatively high concentrations of total solids. For example, in Sharp Patent No. 2,728,678, it is specified that skim milk is preferably concentrated to about 55% total solids, and whole milk from 50% to 52% total solids.

As herein described, I have found that the preheating of the fluid milk at a temperature and time comparable to 185° F. for 15 minutes, prior to concentration, substantially denatures a substantial portion of the whey proteins in the milk, which increases the viscosity of the concentrate and enhances the flavor of the end dry product when it is reconstituted with water.

I have also found that the increase in the rate of viscosity of the concentration, but with a lower concentration of the total solids than that specified in the earlier art, is one of the features of my invention for the production of a powdered milk product containing fat which is superior in producing a more immediate and instant reconstitution of the powder into a milk product when added to water. I have also discovered a manner of "seeding" by which I maintain substantially the same relative proportions of milk solids not fat as existed in the fresh milk from which the solids are made. Other features of my invention for the production of a larger powder particle and for superior taste qualities as hereinafter described also constitute substantial advances over the prior art.

I have discovered that it is possible to obtain the desired increased viscosity in the concentrate by crystallizing the lactose to form the hydrate state and yet not enter the danger zone of increased total solids concentration.

A principal objective of earlier discoveries has been the formation of a dried product in which the lactose has been crystallized for the purpose of stabilizing the product from caking due to moisture adsorption. One of the main objectives of the present invention is to make a product which will more readily reconstitute with water without necessarily affecting the moisture adsorption of the product. This objective is accomplished by increasing particle size which is, in part, due to increasing the viscosity of the concentrate through crystallizing a portion of the lactose. The rate of wetting of the lactose is increased by crystallizing a portion of it. An improved product is also obtained by maintaining the total solids of the concentrate within the range of 35% to 45% total solids.

The manufacture of instant dry milk products containing fat pursuant to my method results in a finished product which has particles which, on the average, are of a much larger size than that of the conventional dry milk products containing fat. Approximately 90% of the usual or conventional dry milk solids containing fat will pass through a sieve having openings 88 microns in size. Approximately 75% of the product manufactured by my process is retained on sieve of such size; thereby showing that my method of manufacture does influence particle size. As stated, I have found that particle size and the state of the lactose is important in the reconstitution of milk powder.

Another desirable property in the finished product made pursuant to my invention is a distinct sweet flavor which, when the powder is reconstituted with water, has the flavor of the initial fresh milk containing fat. It is believed that the preheating treatment of the fluid milk, the state of the lactose and my preferred temperature range of the outgoing drying air in the dryer are largely responsible for the desirable taste. Moreover, the taste is further improved when the fat is added after the holding and seeding treatment, as hereinafter described.

A preferred example of my process, reference being made to FIG. 1, is as follows: Fluid skim milk flows from storage or holding tank 1 through milk pump 2 to heat exchanger 3 where it is preheated. The range of temperature and holding in such heat exchanger are preferably comparable to approximately 15 minutes at 185° F. The effect of such preheating step is substantially to denature a substantial portion of the whey proteins in the milk.

The fluid skim milk then flows to evaporators 4 and 4' where it is concentrated to a total solids content ranging between 35% and 45%. I have found that a total solids concentrate of about 37% to 42% is the preferred range. The concentrate is then pumped by pump 5 on a continuous basis from the evaporators through a heat exchanger 6 where the concentrate is heated to approximately 165° F. After a holding period of approximately 20 seconds in heat exchanger 6, the concentrate is forwarded to heat exchanger 7 where it is cooled to between approximately 80° F. to 95° F., preferably about 95° F. The concentrate is then pumped by pump 8 into a relatively large agitator-equipped cooling vat 9 where slow continuous cooling is accomplished, until it reaches a preferred temperature of about 40° F. to 45° F. Agitation is carried out slowly as the concentrate is accumulated in the cooling vat. Such cooling of the concentrate aids in the development of the lactose crystals from the lactose solution which has become supersaturated in respect to lactose.

The concentrate may be examined from time to time under a microscope to determine the extent of lactose crystallization. When there is evidence of some large alpha lactose crystals approximately 1½ gallons of concentrate from a previous operation may be added to each 1,000 pounds of concentrate in the vat. The quantity of concentrate added may be reduced if the time for crystallization is lengthened, and if the crystallization process is accelerated the amount of concentrate added may be increased. After an operator has become familiar with the proper appearance and viscosity of the concentrate in the vat, he may determine the time for addition of the concentrate from a previous operation by observation or by use of a viscosity meter, without use of a microscope. I have found for commercial operations that the concentrate may be held overnight in the cooling vat for 12 to 14 hours and the additional concentrate may be added the following morning. However, such additional concentrate may be added at any time after the appearance of large lactose crystals in the concentrate in the vat.

After the addition of the concentrate from a previous operation to the concentrate in the vat 9 the contents of the vat are agitated for about 2 to 3 hours. Fat, preferably in the form of homogenized cream, is then added to the concentrate in such amount and proportion as to provide the desired percentage of fat in the finished dry product, which standardization procedures are well-known by persons skilled in the art. The cream may be homogenized at a pressure within the range of about 1500 to 2500 pounds per square inch, with either single or double effect. After the fat is added, agitation of the cream and concentrate is continued until they are well-mixed. I have found that agitation of the cream and concentrate for about one hour produces a satisfactory mixture.

The mixture is then pumped by pump 10 through heat exchanger 11 to raise the temperature of the mixture within the range of approximately 85° F. to 125° F., preferably between 100° F. and 115° F., as the mixture is forced through high pressure pump 12 into the spray-type milk dryer 13. The drying is carried out at preferable pressures of approximately 1,000 to 1,500 pounds per square inch through pump 12 to the dryer nozzles (not shown) of dryer 13, though such pressures may range between 1,000 and 2,000 pounds per square inch. The orifices of the dryer nozzles may range from .047 inch to .067 inch in diameter.

The temperature of the incoming drying air in the dryer preferably ranges between approximately 310° F. and 330° F., though the temperature of the incoming air may be as high as 600° F. The temperature of the outgoing drying air in the dryer preferably ranges between approximately 165° F. and 210° F., though I have found the range between about 168° F. and 170° F. particularly desirable.

The dried powder is then removed from the dryer to the powder cooler and sifter 14 and cooled to a temperature of less than 100° F. The moisture content of the finished product is held between 3% and 4% by weight. The substantial portion of the lactose in the finished product is in a crystalline state. It is believed that more crystalline beta lactose results from this procedure than is found in conventional instant type dry milk.

The concentrate from a previous operation which is added to the concentrate in the vat is prepared in the same manner as the concentrate in the vat. It has been my practice to withdraw a portion of the concentrate from the vat 9 about one hour after seeding, though it may be withdrawn sooner or later. The concentrate so withdrawn is then placed under refrigeration until added to the vat in a subsequent operation in the manner above described. During the period that such concentrate is under refrigeration the lactose becomes partially crystallized. I have found that storage of such concentrate for approximately 20 to 22 hours is satisfactory, after which it may be introduced into the concentrate in the vat as above described, though shorter or longer periods of storage will also prove satisfactory. If the lactose in the added concentrate of such previous operation has had little or no chance to crystallize, it will not produce as satisfactory crystallization after it is added to the vat of concentrate, as when permitted to crystallize before being added.

A product having the desirable characteristics described hereinabove may also be obtained by the addition of commercial milk sugar or lactose rather than concentrate from a previous operation. I have found that when commercial milk sugar is added to the concentrate in the vat, approximately one pound of such commercial lactose sugar is adequate for each 1,000 pounds of concentrate in the vat. The amount of milk sugar added may be varied somewhat depending upon the degree of crystallization of the concentrate in the vat. In all other respects the procedure is the same when using commercial milk sugar or lactose as I have described when concentrate from a previous operation is added to the concentrate in the vat.

A modification in standardization of the concentrate before spray drying is accomplished by adding the desired amount of fat, preferably cream which may be homogenized or unhomogenized, to the seeded concentrate, mixing the concentrate and fat, and then homogenizing the resulting mixture before introducing it into the dryer. Such complete homogenization tends to prevent the cream from "oiling off." The mixture may be homogenized at a pressure in the range of about 1500 to 3500 pounds per square inch, with either single or double effect.

A further modification of my procedure for producing an instant dry milk product containing fat is to standardize the fluid milk at the beginning of the process, prior to the initial preheating step, by standardizing fluid whole milk to the proper ratio of fat to solids not fat desired in the final product, which standardization procedures are well-known in the art. The concentration of the milk is preferably 37% to 42%. In all other respects, the procedure is the same as described above, except that it is not necessary to add fat after the seeding step. While such procedure produces a satisfactory product, by adding the fat after seeding the concentrate, detrimental effects on the fat and undesirable flavor changes are minimized.

It will be obvious from the foregoing to those skilled in the art that my invention is equally applicable to the production of other dry milk products, or of dried chocolate flavored drinks from milk products, as well as where specific solids of milk such as fat, casein, whey proteins, salts, etc. have been removed. It will be understood that the present invention is not confined to the precise methods and procedures nor the precise construction and arrangement of parts as herein illustrated and described, but employs all modifications thereof within the scope of the following claims.

I claim:
1. The method of producing an instant type of dry milk containing fat which comprises, preheating fluid skim milk substantially to denature a substantial portion of the whey proteins therein, then evaporating such milk to produce a skim milk concentrate of between 35% and 45% total solids, cooling the same until large alpha lactose crystals appear therein, then adding other milk concentrate containing partially crystallized lactose, agitating said concentrates until a mixture of relatively high viscosity is produced, adding fat to such mixture, agitating said fat and said concentrates to mix the same, and spray drying the resulting mixture to produce particles relatively large in size.

2. The method of claim 1 wherein the fat added to the mixture of concentrates is homogenized cream.

3. The method of claim 1 wherein the added milk concentrate is from a previous similar operation.

4. The method of producing an instant type of dry milk which comprises, preheating fluid skim milk substantially to denature a substantial portion of the whey proteins therein, then evaporating such milk to produce a skim milk concentrate of between 35% and 45% total solids, cooling the same until large alpha lactose crystals appear therein, then adding other milk concentrate containing partially crystallized lactose, agitating said concentrates until a mixture of relatively high viscosity is produced, adding fat to such mixture, agitating said fat and said concentrates to mix the same, homogenizing the resulting mixture, and then spray drying the homogenized mixture to produce particles relatively large in size.

5. The method of claim 4 wherein the fat added to the mixture of concentrates is homogenized cream.

6. The method of claim 4 wherein the added milk concentrate is from a previous similar operation.

7. The method of producing an instant type of dry milk containing fat which comprises, preheating standardized fluid milk containing fat substantially to denature a substantial portion of the whey proteins therein, then evaporating such milk to produce a milk concentrate of between 35% and 40% total solids, cooling the same until large alpha lactose crystals appear therein, then adding other milk concentrate containing partially crystallized lactose, agitating said concentrates until a mixture of relatively high viscosity is produced, spray drying the mixed concentrates to produce particles relatively large in size.

8. The method of claim 1 wherein the added milk concentrate is from a previous similar operation.

9. The method of producing an instant type of dry milk containing fat which comprises, preheating fluid skim milk substantially to denature a substantial portion of the whey proteins therein, then evaporating such milk to produce a milk concentrate of between 35% and 45% total solids, cooling the same until large alpha lactose crystals appear therein, then adding milk sugar, mixing said concentrate and milk sugar until a mixture of relatively high viscosity is produced, adding fat to such mixture, mixing said fat and said mixture and spray drying the resulting mixture to produce particles relatively large in size.

10. The method of claim 9 wherein the fat added to the mixture of concentrate and milk sugar is homogenized cream.

11. The method of producing an instant type of dry milk containing fat which comprises, preheating fluid skim milk substantially to denature a substantial portion of the whey proteins therein, then evaporating such milk to produce a milk concentrate of between 35% and 45% total solids, cooling the same until large alpha lactose crystals appear therein, then adding milk sugar, mixing said concentrate and milk sugar until a mixture of relatively high viscosity is produced, adding fat to such mixture, mixing said fat and said mixture, homogenizing the resulting mixture, and then spray drying the homogenized mixture to produce particles relatively large in size.

12. The method of claim 11 wherein the fat added to the mixture of concentrate and milk sugar is homogenized cream.

13. The process of manufacturing an instant type of dry milk containing fat which comprises, preheating standardized fluid milk containing fat substantially to denature a substantial portion of the whey proteins therein, then evaporating such milk to produce a milk concentrate of between 35% and 40% total solids, cooling the same until large alpha lactose crystals appear therein, then adding milk sugar, mixing said concentrate and milk sugar until a mixture of relatively high viscosity is produced, and spray drying the mixed concentrate to produce particles relatively large in size.

14. The process of manufacturing an instant type of dry milk containing fat which comprises, preheating fluid skim milk to a temperature and holding period comparable to approximately 185° F. for 15 minutes, whereby substantially to denature a substantial portion of the whey proteins in the milk, then evaporating such milk to produce a skim milk concentrate of between 35% and 45% total solids and cooling the same, adding crystallized lactose to said concentrate, agitating said concentrate and lactose to produce a mixture of relatively high viscosity, adding milk fat to such mixture, agitating said fat and said concentrate to mix the same, introducing the said concentrate into a spray dryer having relatively large orifices at low pressure and temperatures ranging between about 85° F. and 125° F., the temperature of the incoming drying air in said dryer ranging between approximately 310° F. and 600° F., and the temperature of the outgoing air ranging between approximately 165° F. and 210° F. to produce dried particles relatively large in size, and cooling the dried product.

15. The process of manufacturing an instant type of dry milk containing fat which comprises, preheating fluid skim milk to a temperature and holding period comparable to approximately 185° F. for 15 minutes whereby substantially to denature a substantial portion of the whey proteins in the milk, then evaporating such milk to produce a skim milk concentrate of between 35% and 45% total solids and cooling the same, adding crystallized lactose to said concentrate, agitating said concentrate and lactose to produce a mixture of relatively high viscosity, adding milk fat to such mixture, agitating said fat and said concentrate to mix the same, homogenizing the resulting mixture, introducing the homogenized mixture into a spray dryer having relatively large orifices at low pressure and temperatures ranging between about 85° F. and 125° F., the temperature of the incoming drying air in said dryer ranging between approximately 310° F. and 600° F., and the temperature of the outgoing air ranging between approximately 165° F. and 210° F. to produce dried particles relatively large in size, and cooling the dried product.

16. The process of manufacturing an instant type of dry milk containing fat which comprises, preheating standardized fluid milk containing fat to a temperature and holding period comparable to approximately 185° F. for 15 minutes whereby substantially to denature a substantial portion of the whey proteins in the milk, then evaporating such milk to produce a skim milk concentrate of between 35% and 40% total solids and cooling the same, adding crystallized lactose to said concentrate, agitating said concentrate and lactose to produce a mixture of relatively high viscosity, introducing said mixture into a spray dryer having relatively large orifices at low pressure and temperatures ranging between about 85° F. and 125° F., the temperature of the incoming drying air in said dryer ranging between approximately 310° F. and 600° F., and the temperature of the outgoing air ranging between approximately 165° F. and 210° F. to produce dried particles relatively large in size, and cooling the dried product.

17. The process of manufacturing an instant type dry milk containing fat wherein fluid skim milk is heated to a temperature sufficient substantially to denature a substantial portion of the whey proteins therein, then evaporating such milk to a concentrate ranging between 35% and 45% total solids, cooling and agitating said concentrate until relatively large alpha crystals are developed therein, adding crystallized lactose equivalent to the proportion of approximately 1 to 1½ pounds of sugar milk for each 1,000 pounds of concentrate, followed by mixing said concentrate and the crystallized lactose for approximately 2 to 3 hours to produce a mixture of relatively high viscosity, standardizing said mixture with homogenized cream in a quantity to produce the desired fat content of the finished dry milk, agitating said milk fat and said concentrate for approximately one hour to thoroughly mix the same, introducing said mixture of concentrate and milk fat into a spray dryer having relatively large orifices at low pressure and temperatures ranging between about 85° F. and 125° F., the temperature of the incoming drying air in said dryer ranging between approximately 310° F. and 600° F., and the temperature of the outgoing air ranging between approximately 165° F. and 210° F. to produce dried particles relatively large in size, and cooling the dried product.

18. The process of manufacturing an instant type dry milk containing fat wherein fluid skim milk is heated to a temperature sufficient substantially to denature a substantial portion of the whey proteins therein, then evaporating such milk to a concentrate ranging between 35% and 45% total solids, cooling and agitating said concentrate until relatively large alpha crystals are developed therein, adding crystallized lactose equivalent to the proportion of approximately 1 to 1½ pounds of milk sugar for each 1,000 pounds of concentrate, followed by mixing said concentrate and the crystallized lactose for approximately 2 to 3 hours to produce a mixture of relatively high viscosity, standardizing said mixture with milk fat in a quantity to produce the desired fat content of the finished dry milk, agitating said milk fat and said concentrate for approximately one hour to thoroughly mix the same, homogenizing the resulting mixture, introducing the homogenized mixture into a spray dryer having relatively large orifices at low pressure and temperatures ranging between about 85° F. and 125° F., the temperature of the incoming drying air in said dryer ranging between 310° F. and 600° F., and the temperature of the outgoing air ranging between approximately 165° F. and 210° F. to produce dried particles relatively large in size, and cooling the dried product.

19. The process of manufacturing an instant type dry milk containing fat wherein standardized fluid milk containing fat is heated to a temperature sufficient substantially to denature a substantial portion of the whey proteins therein, then evaporating such milk to a concentrate ranging between 35% and 40% total solids, cooling and agitating said concentrate until relatively large alpha crystals are developed therein, adding crystallized lactose equivalent to the proportion of approximately 1 to 1½ pounds of milk sugar for each 1,000 pounds of concentrate, followed by mixing said concentrate and the crystallized lactose for approximately 2 to 3 hours to produce a mixture of relatively high viscosity, introducing said mixture into a spray dryer having relatively large orifices at low pressure and temperatures ranging between 85° F. and 125° F., the temperature of the incoming drying air in said dryer ranging between approximately 310° F. and 600° F., and the temperature of the outgoing air ranging between approximately 165° F. and 210° F. to produce dried particles relatively large in size, and cooling the dried product.

References Cited in the file of this patent
UNITED STATES PATENTS
2,728,678   Sharp _____ Dec. 27, 1955
OTHER REFERENCES
Hunziker, "Condensed Milk and Milk Powder," La Grange, Ill., 1949, 7th edition, page 435.

UNITED STATES PATENT OFFICE
CERTIFICATE OF CORRECTION

Patent No. 3,078,167 February 19, 1963

Maurice A. Rice

It is hereby certified that error appears in the above numbered patent requiring correction and that the said Letters Patent should read as corrected below.

Column 2, line 30, for "concentrated" read -- concentration --; column 7, line 53, for "sugar milk" read -- milk sugar --.

Signed and sealed this 15th day of October 1963.

(SEAL)
Attest:

ERNEST W. SWIDER
Attesting Officer

EDWIN L. REYNOLDS

Acting Commissioner of Patents